United States Patent [19]

Wickramasinghe

[11] Patent Number: 5,392,118
[45] Date of Patent: * Feb. 21, 1995

[54] METHOD FOR MEASURING A TRENCH DEPTH PARAMETER OF A MATERIAL

[75] Inventor: Hemantha K. Wickramasinghe, Chappaqua, N.Y.

[73] Assignee: International Business Machines Corporation, Armonk, N.Y.

[*] Notice: The portion of the term of this patent subsequent to Jan. 24, 2012 has been disclaimed.

[21] Appl. No.: 125,955

[22] Filed: Sep. 22, 1993

Related U.S. Application Data

[63] Continuation-in-part of Ser. No. 63,109, May 17, 1993, which is a continuation-in-part of Ser. No. 882,386, May 13, 1992, abandoned.

[51] Int. Cl.$^6$ .............................................. G01B 9/02
[52] U.S. Cl. .................................. 356/355; 356/357; 356/378; 356/382
[58] Field of Search ............... 356/378, 381, 382, 372, 356/355, 357

[56] References Cited

U.S. PATENT DOCUMENTS 4,615,620 10/1986 Noguchi et al. ..................... 356/378
4,744,660 5/1988 Noguchi et al. ..................... 356/355

Primary Examiner—David A. Redding
Attorney, Agent, or Firm—Stephen C. Kaufman

[57] ABSTRACT

A method suitable for measuring a trench depth parameter of a material. The method comprises the steps of propagating source radiation around a trench and through the material; and analyzing a characteristic variation of an interference signal as a determinant of the trench depth parameter; the interference signal developing as radiation from a base of the trench interferes with radiation propagated from a top surface of the material.

5 Claims, 3 Drawing Sheets

METHOD FOR MEASURING A TRENCH DEPTH PARAMETER OF A MATERIAL

CROSS-REFERENCES TO RELATED APPLICATIONS

This application is a continuation-in-part of U.S. Ser. No. 08/063,109, filed May 17, 1993, which is a continuation-in-part of U.S. Ser. No. 07/882,386, filed May 13, 1992, now abandoned. Each of these applications is commonly assigned. The entire disclosure of each of these applications is incorporated by reference herein.

BACKGROUND OF THE INVENTION

The present invention relates to radiation measurement methods and apparatus and preferably, to optical measurement of the depth of high aspect ratio structures, such as isolation trenches and trench capacitors, in semiconductor material used it the fabrication of integrated circuits or trench depth in an optical disc.

SUMMARY OF THE INVENTION

The fabrication of integrated circuits is changing from the conventional planar device to a cubical device structure. As a result, the measurement of the depth of high aspect ratio structures is of greater importance in the fabrication of integrated circuits.

In accordance with one aspect of the present invention, a laser beam transparent to a workpiece such as semiconductor material is used for measuring the depth of narrow deep structures in the semiconductor material used in fabricating integrated circuits. Exemplary applications are the measurements of the depth of isolation structures and trench capacitors in silicon.

The wavelength of the laser beam may be selected so that the semiconductor material is transparent to the incident radiation. That is, the light beam penetrates through the semiconductor material. Moreover, the wavelength may also be selected to be greater than the lateral dimension of the structure to be measured.

The radiation that penetrates the semiconductor material will be scattered by any discontinuities encountered. In the case of measuring a trench, there is a strong discontinuity at both the top and the bottom of the trench. The discontinuities cause the creation of Huygens wavelets which are spherical in form when the discontinuity is smaller than the wavelength. The Huygens wavelets will interfere in phase and result in a strong backscattered plane wave at certain discrete angles of incidence. The backscattered wave intensity can be detected by focusing the wave through a pin hole onto a photodiode. However, when higher measurement sensitivity is required, which will not be the situation unless the wavelength of the light is much greater than the trench width, a heterodyne system can be used. In such case, single photons can be detected and scattering from atomic size features can, in principle, be observed. See, for example, U. S. Pat. No. 4,947,141 issued to H. Wickramasinghe et al, assigned to the same assignee as the present application, and incorporated by reference herein. One object of the present invention is, therefore, the provision of all optical measurement system for measuring the depth of high aspect ratio structures in semiconductor material. Another object of the present invention is the provision of an optical depth measurement system utilizing a light source transparent to the material to be measured and having a wavelength greater than the lateral width of the structure to be measured. A further object of the invention is the provision of an optical system for measuring the dimensions of an isolation trench and trench capacitor in a semiconductor material.

In its broadest aspect, the present invention provides a method suitable for measuring a trench depth parameter of a material, the method comprising the steps of:
 a) propagating source radiation around a trench and through the material; and
 b) analyzing a characteristic variation of an interference signal as a determinant of the trench depth parameter;

the interference signal developing as radiation from a base of the trench interferes with radiation propagated from a top surface of the material.

In its broadest aspect, the invention as defined comprises a step of analyzing a characteristic variation of an interference signal as a determinant of the trench depth parameter. This step, in turn, may be realized in at least three modes including wavelength tuning, depth sampling, and angle tuning. These three modes are now defined.

Wavelength tuning comprises the following preferred sequence.

Preferably, collimated partially coherent light is first scattered off the material at or near normal incidence. The light may comprise a single wavelength from a variable wavelength laser, or a narrow band filtered component of a broadened source such as a light bulb, LED, or glow source at a measurement wavelength. The filtration may be done either before or after scattering off the material.

Second, the scattered light may be detected using a detector appropriate to the measurement wavelength. In all cases, the measurement wavelength range is chosen such that the material containing the trenches is transparent to all measurement wavelengths.

Third, a variation in the intensity (I) of the developed interference signal can be approximated as a function of trench depth and index of refraction in the material (at fixed angle of incidence), as follows:

$$I\alpha\cos\left(\frac{4\pi nd}{\lambda}\right) \tag{1}$$

where,
 d = depth of a trench
 n = index of refraction of the material,.

A 0 order scattered component is typically the one detected, but this is not required.

Fourth, the depth of the trench structure may be determined by varying the measurement wavelength ($\lambda$) (hence, wavelength tuning), recording a variation in the intensity of the interference signal from the detector over the measurement range, and relating the variation to the known interference properties of the material, given the index of refraction n, the measurement wavelength, and using suitable mathematical methods.

A second mode of the present invention comprises depth sampling and includes the following preferred sequence.

First, partially coherent or fully coherent monochromatic light is scattered off the material, as above, except that the measurement wavelength is fixed during an entire measurement cycle. The second mode requires that the depth of the trench be changing as a function of time. The interference signal is observed as a function of time, as a trench structure is forming. Accordingly, in this second mode, the measurement wavelength is held constant, and the rate of trench depth change during measurement is assumed to be merely constant or minimal i.e., always positive or zero.

The variation of the interference signal versus time can be used to determine the depth of the trench as a function of time, by again relating an observed signal intensity to the known interference properties of the material, and using suitable mathematical techniques.

For example, the second mode requires a known starting depth (typically zero), or a known etch rate. In a typical situation, interference signal peaks may be observed versus time, and trench depth change versus time may be established using the interference relation (1) above, and appropriate mathematics. The change in absolute trench depth versus time may then be used to predict process endpoint and monitor process progress.

Alternatively, note that if the rate of depth change is known, a time separation between peaks in the interference signal can be used for independently determining an absolute depth versus time, by relating, with appropriate mathematical methods, the interference signal versus time, the known rate of change, and the interference properties of the material.

A third mode of the present invention comprises angle tuning. Characteristics of this mode include a constant measurement wavelength, combined with a variable angle of incidence of source radiation.

Note that the present invention further contemplates hybrid modes comprising suitable permutation of features that may be selected from the disparate aforementioned three modes.

Note further, that the present invention, in all modes, comprises developing an interference signal, inter alia, by reflection and/or transmission, and by way of scattering or other representative generating processes.

DETAILED DESCRIPTION

Figure 1:
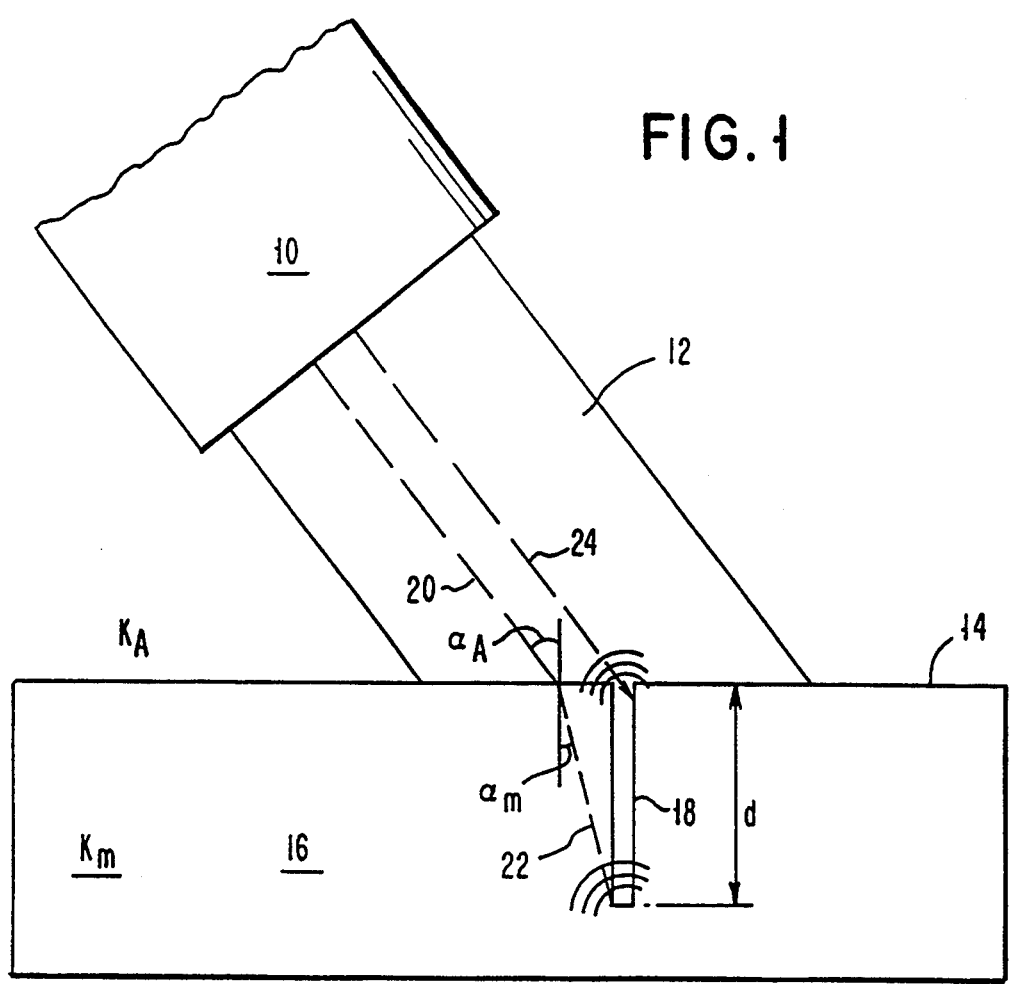
FIG. 1 is a schematic diagram illustrating one principle of the present invention.

Referring now to the figures and to FIG. 1 in particular, there is shown a schematic diagram illustrating a first principle of the test arrangement.

A laser 10 transmits a light beam 12 at an angle of incidence $\alpha_A$ toward the surface 14 of a workpiece 16, such as semiconductor material having a high aspect ratio structure 18 of depth d disposed therein. Light ray 20 is refracted at the surface 14 of workpiece 16 to propagate within the workpiece 16 as a refracted ray 22 at a refracted angle $\alpha_m$ and is incident at the bottom of the structure 18. Light ray 24 is incident at the top of the structure 18. The propagation constants in air and in the material are $K_A$ and $K_m$, respectively. Then, according to Snell's Law:

$$K_A \sin \alpha_A = K_m \sin \alpha_m \tag{2}$$

$$\sin \alpha_m = \frac{K_A}{K_m} \sin \alpha_A \tag{3}$$

$$\alpha_m = \sin^{-1}\left(\frac{K_A}{K_m} \sin \alpha_A\right) \tag{4}$$

For maximum backscatter, i.e. interference from light scattered at both the top and bottom of the structure 18, $$2dK_m \cos \alpha_m = 2\pi n \tag{5}$$

where $$K_m = \frac{2\pi}{\lambda_m},$$

and $$\cos \alpha_m = \frac{n\lambda_m}{2d} \tag{6}$$

Figure 2:
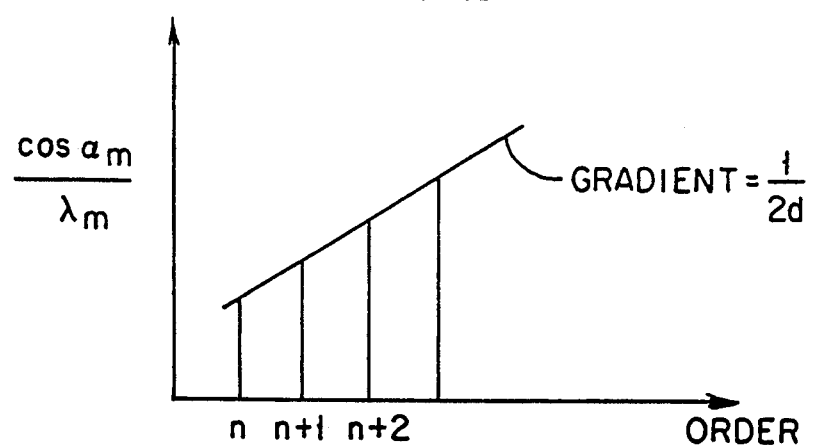
FIG. 2 is a graphical representation of a plot of cos $\alpha_m/\lambda_m$ versus n.

To measure values of $\alpha_m$ for which consecutive maxima in the backscattered waves occur, FIG. 2 shows a graphical representation of cos $\alpha_m/\lambda_m$ versus orders n, n+1, n+2 and so forth. The gradient of the straight line shown in FIG. 2 is $\frac{1}{2}$d, where d is the depth of the structure or trench 18. Therefore, by detecting consecutive maxima backscatter signals and measuring the angle of incidence of the beam for each maxima, the depth of the structure is derived from a single calculation.

It will be apparent to those skilled in the art that from equation 5, it is also possible to maintain the angle of incidence fixed and vary the wavelength $\lambda_m$ to measure values of wavelength $\lambda_m$ for which consecutive maxima in the backscatter occur. Therefore, by detecting consecutive maxima backscatter signals and measuring the wavelength for each maxima, the depth of the structure is derived from a single calculation.

Alternatively, both the angle of incidence and the wavelength can be fixed while the depth d is varied, for example as a trench is being fabricated in a material. In this case, maxima at orders n, n+1, n+2 and so forth occur at depths d in accordance with the calculation per equation 4. By counting consecutive maxima and by interpolating for desired depths between consecutive maxima, it is possible to use the present invention to measure the depth of a structure with both the angle of incidence and the wavelength fixed at respective predetermined values.

Figure 3:
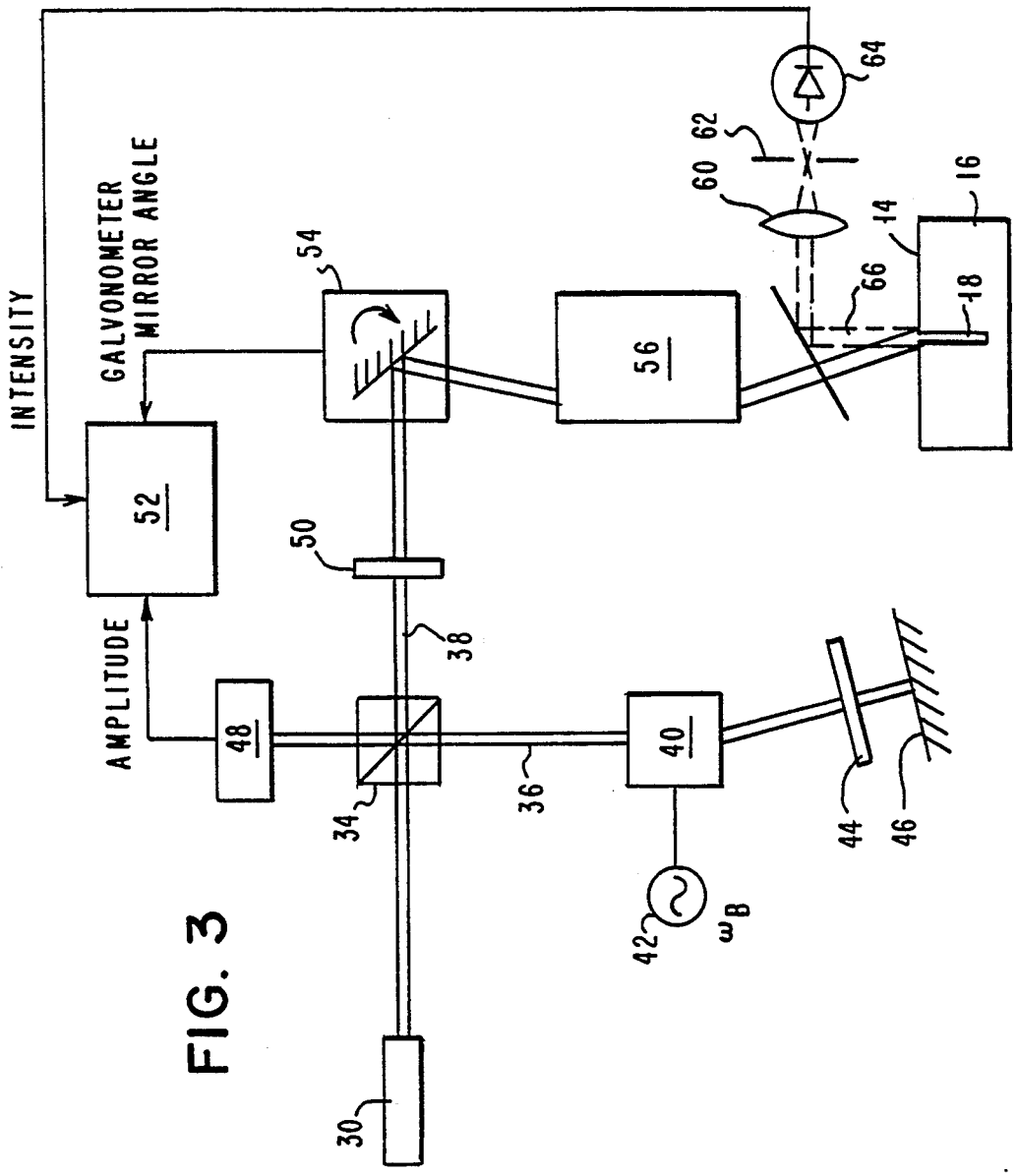
FIG. 3 is a schematic representation of a first embodiment of the present invention.

Having described the basic principle of the present invention, in FIG. 3 there is shown a schematic representation of a preferred embodiment of the present invention.

A laser 30 transmits a linearly polarized laser beam 32 to a polarizing beam splitter cube 34 where the plane of polarization of the beam is disposed at 45 degrees to the axis of the beam splitter cube 34. The beam splitter cube 34 splits the incident beam 32 into two beams 36, 38.

A reference beam 36 is incident on a Bragg cell 40 where the frequency of the beam 36 is shifted by the Bragg frequency $\omega_B$ as determined by oscillator 42. After traversing the Bragg cell, the beam travels through a quarter wave plate 44 to a retro-reflecting mirror 46.

After being reflected at mirror 46, the beam travels back through the quarter-wave plate 44 where the polarization of the beam is rotated through 90 degrees. While traveling through the Bragg cell 40 a second time, the optical frequency is shifted again by the Bragg frequency. A portion of the beam exiting the Bragg cell passes through beam splitter cube 34 to a detector 48, such as a polarizer/photodiode/lock-in amplifier combination. The beam 38 exiting the beam splitter cube 34 is transmitted through a Faraday rotator 50 where the beam polarization is rotated by 45 degrees and than directed on the axis of a rotating galvanometer mirror 54. The rotation angle of the galvanometer mirror 54 determines the angle of incidence $\alpha_A$ of the light beam on the surface 14 of the workpiece 16 and the angle of refraction $\alpha_m$ of the light beam traveling through the workpiece 16.

A 1:1 telescope 56 is placed at a distance equal to its focal length from the mirror 54. As a result, an image of the spot on mirror 54 is projected via pellicle beamsplitter 58 onto the surface 14 of the workpiece 16 when the workpiece is disposed at a distance from the telescope 56 equal to the focal length of the telescope.

The backscattered light from the surface 14 travels back through the same path as the incident beam, including traveling through the Faraday rotator 50 where the polarization rotates by all additional. 45 degrees. The beam after traveling through the Faraday rotator 50, is reflected at the polarization beam splitter cube 34 and travels colinearly with the reference beam to the detector 48.

The amplitude of the beat signal having a frequency equal to twice the Bragg frequency received at the polarizer/photodiode/lock-in amplifier combination 48 is proportional to the amplitude of the backscatter beam arising from structures 18 in the workpiece 16. In most applications, the magnitude of the backscatter responsive signal will be much less than the magnitude of the beam 38 and the voltage measured by the detector 48 will be directly proportional to the amplitude of the backscattered beam from workpiece 16.

In performing the depth measurement, as mirror 54 rotates a laser beam scans at varying incident angles on the surface 14 of the workpiece 16 concurrently with the polarizer/photodetector/lock-in amplifier combination 48 measuring the amplitude of the backscatter signal from the surface 14, both of which signals are recorded by a computer 52. Upon encountering a discontinuity in the workpiece, such as structure 18, a relative maximum backscatter signal is detected by the detector 48 at discrete incident angles. A maximum signal is detected at incident angles of the beam 12 where there is constructive interference from backscattered ray 24 from the top of structure 18 and from the ray 22 transmitted through workpiece 16 and backscattered from the bottom of the structure 18. The computer 52 correlates a maximum amplitude from detector 48 with the corresponding angle of galvanometer mirror 54. A curve of the form shown in FIG. 2 is generated. The slope of the curve is inversely proportional to the depth of the structure 18.

Instead of detecting the backscatter signal using the polarizer/photodiode/lock-in amplifier combination, in an alternative embodiment, scattered waves 66 that propagate in a direction perpendicular to the surface 14 are partially reflected by pellicle beam splitter 58 and focussed by a lens 60 through a pin-hole 62 onto a photodiode 64. In this alternative embodiment the intensity of the scattered wave detected at photodiode 64 is recorded by the computer 52 along with the corresponding angle of mirror 54. In the alternative embodiment the condition for maximum backscatter interference is slightly modified from that stated in equation (6) supra. The maximum backscatter in the alternative embodiment occurs according to the following equation $$\cos \alpha_m = \frac{n \lambda_m}{d} - 1 \qquad (7)$$

Since the predetermined wavelength of the laser beam is known, correlation of the angle of incidence and hence, the angle of refraction of the beam within the material 16, with the consecutive maxima backscattered signals results in a linear relationship of the form shown in FIG. 2. Calculation of the gradient or slope of the curve by computer 52 provides a value inversely proportional to the depth d of the structure 18.

When the semiconductor material 16 is silicon, for example, the wavelength of the laser beam can be 1.3 microns in order to penetrate the silicon. The wavelength inside the silicon will be 0.37 microns which is longer than the typical width of a trench, i.e. approximately 0.25 micron. Such an arrangement permits the depth of a trench to be measured using either of the above described techniques.

While silicon is a preferred semiconductor material to be measured, other materials used in the fabrication of integrated circuits such as silicon nitride and silicon dioxide are also capable of being measured using the present invention.

The laser may be a solid state, gas, or YAG laser or the like capable of transmitting laser beams having a wavelength in the range between approximately 0.6328 microns and 1.3 microns.

The present invention therefore provides a simple method and apparatus for measuring the depth of high aspect ratio structures, such as isolation trenches or capacitive trenches, in semiconductor materials used in the fabrication of integrated circuits.

While the invention has been described in conjunction with the measurement of a single structure in a semiconductor material used in the fabrication of integrated circuits, the same method and apparatus are equally applicable to the testing of a workpiece containing multiple such structures.

Figure 4:
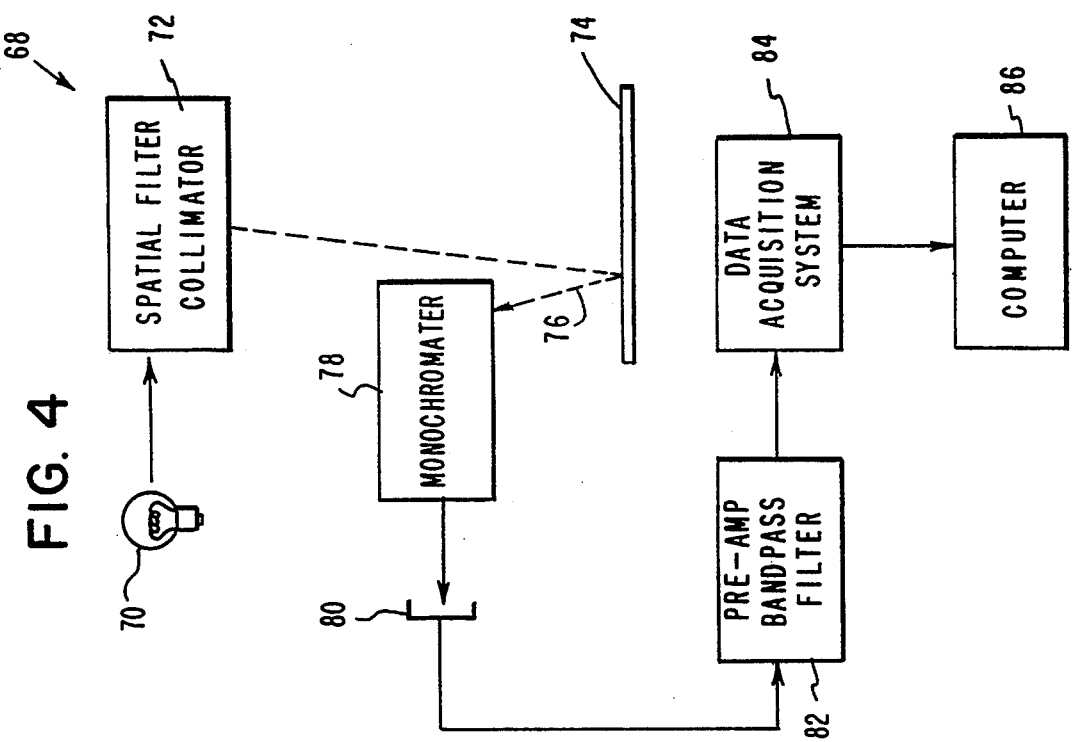
FIG. 4 is a schematic representation of a second embodiment of the present invention.

Attention is now directed to FIG. 4 which shows an assembly 68 that is suitable for realizing that movie of the present invention identified above as wavelength tuning. In overview, the FIG. 4 wavelength tuning comprises a variable wavelength methodology, a fixed or variable trench depth, and a preferred (since inexpensive, compared to a laser) utilization of a tungsten halogen light source 70. The operation of the FIG. 4 assembly 68 is as follows.

Light is emitted from the source 70, and directed through a conventional spatial filter collimator 72. Preferably, the light is further directed to a test material 74 by way of a mirror at near normal incidence.

A scattered beam 76 is imaged through a conventional scanning monochrometer 78 on to a conventional detector 80 suitable to the measurement wavelength range. An electrical signal from the detector 80 is then amplified and optimally bandpass filtered to an AC signal (box 82).

The filtered signal preferably is next amplified, offset and converted to a digital form using a conventional data acquisition system 84, for subsequent storage in a computer 86.

Preferably, the digitized signal is averaged one or more times, and then digitally filtered to remove noise. The noise reduced signal is then processed to isolate peak features in the signal versus wavelength. The peak signal is then convolved with the intensity variation function cos $$\frac{(\pi n \lambda)}{d}$$

over the depth range of interest. The location maximum of the convolved signal versus depth may be interpreted as the trench depth.

Figure 5:
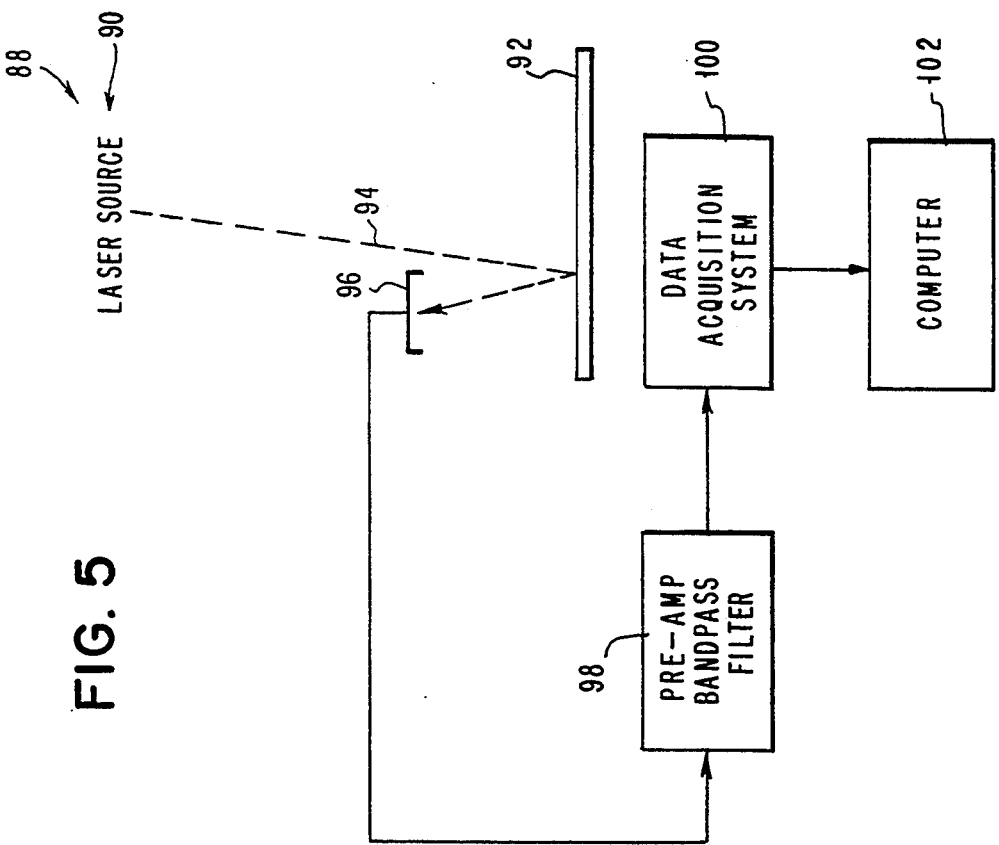
FIG. 5 is a schematic representation of a third embodiment of the present invention.

Attention is now directed to FIG. 5, which shows an assembly 88 that is suitable for realizing that mode of the present invention identified above as depth sampling. In overview, the FIG. 5 mode comprises a fixed wavelength methodology, a variable trench depth, and a utilization of a laser source 90. The operation of the FIG. 5 assembly 88 is as follows.

Monochromatic or narrow band light is emitted from the laser source 90, and preferably collimated, spatially filtered and steered to a test material 92, using mirrors at near normal incidence.

A scattered beam 94 is imaged on a detector 96 suitable to the measurement wavelength. An electrical signal from the detector 96 is then amplified and optimally bandpass filtered to an AC signal (box 98).

The filtered signal preferably is then amplified, offset and converted to a digital form using a data acquisition system 100.

Preferably, the digitized signal is averaged one or more times, and then digitally filtered to remove noise. The noise reduced signal is then processed to isolate peak features in the signal as a function of time. The peak signal is then convolved with the intensity variation function cos $$\frac{(\pi n \lambda)}{d},$$

over the depth versus time range of interest.

The location maximum of the convolved signal versus depth rate may be interpreted as the trench depth rate. Given the known initial depth, the trench depth versus time can be computed by integration.

What is claimed is:

1. A method suitable for measuring a trench depth parameter of a material, the method comprising the steps of:
   1) propagating source radiation of wavelength $\lambda$ around a trench of width w, and through the material, wherein $\lambda$ is greater than w ($\lambda > w$); and
   2) analyzing a characteristic variation of an interference signal as a determinant of the trench depth parameter;

said interference signal developing as radiation from a base of the trench interferes with radiation propagated from a top surface of the material.

2. A method according to claim 1, wherein step 2 comprises wavelength tuning.

3. A method according to claim 1, wherein step 2 comprises depth sampling.

4. A method according to claim 1, wherein step 2 comprises angle tuning.

5. A method suitable for measuring a trench depth parameter of a material, the method comprising the steps of:
   1) propagating source radiation around a trench and through the material; and
   2) analyzing a characteristic variation of an interference signal as a determinant of the trench depth parameter;

said interference signal comprising angle tuning and developing as radiation from a base of the trench interferes with radiation propagated from a top surface of the material.

* * * * *